Oct. 30, 1962  W. E. RAMSDEN  3,060,741
TAMPER PROOF DRAIN FOR WATER METERS
Filed Feb. 20, 1957
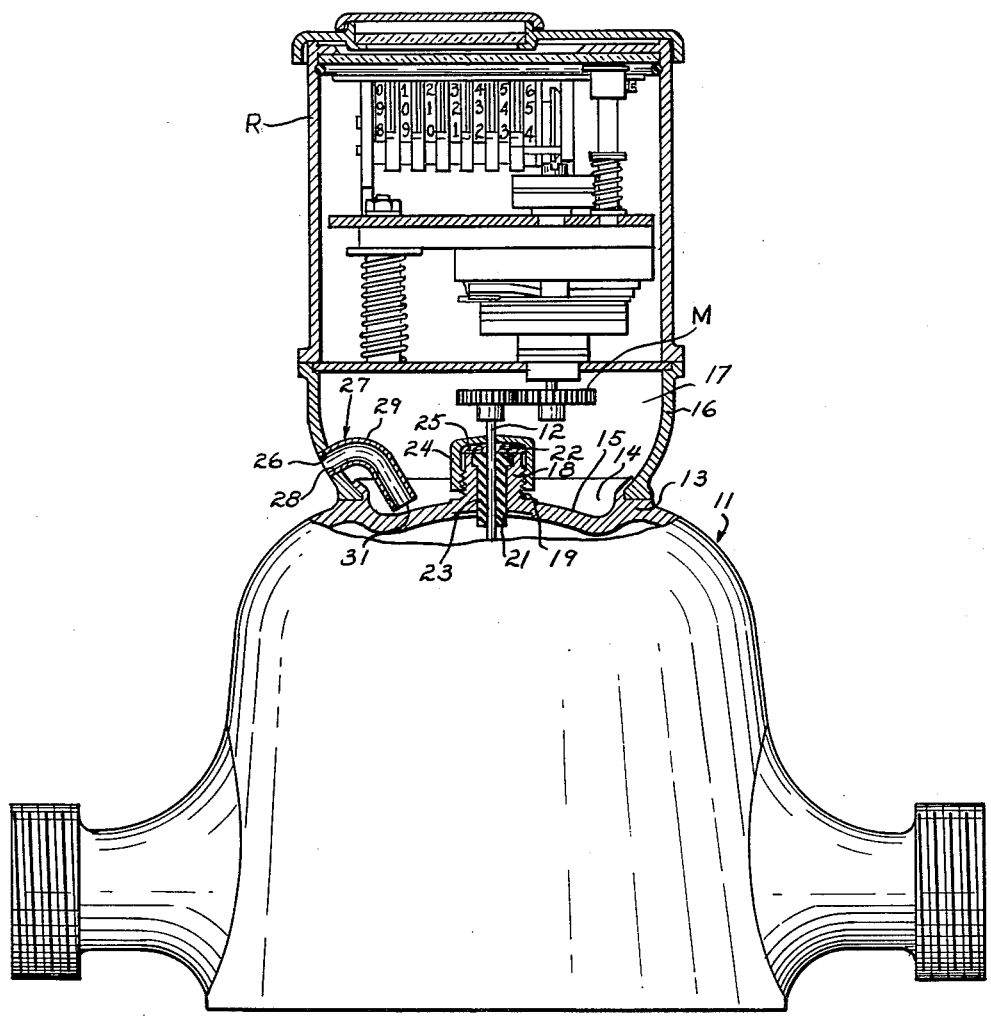
INVENTOR
WILLIAM E. RAMSDEN
BY Strauch, Nolan + Neale
ATTORNEYS ३,०६०,७४१
TAMPER PROOF DRAIN FOR WATER METERS
William E. Ramsden, Uniontown, Pa., assignor to Rockwell Manufacturing Company, Pittsburgh, Pa., a corporation of Pennsylvania
Filed Feb. 20, 1957, Ser. No. 641,370
5 Claims. (Cl. 73—273)

This invention relates to the draining of undesired moisture from meter assemblies to protect the registered mechanism and particularly to a special drain arrangement wherein tampering with the register mechanism by access through the drain is prevented.

A water meter comprises essentially a housing connected into the pipe line and containing an element moved by fluid flow and a register mounted in a separate compartment above the housing and driven by a shaft from the element. Usually the shaft is packed to prevent leakage from the housing into the compartment but experience has shown that over long periods the packing wears or fails and water escapes into the register compartment where it may accumulate to the extent of bursting the register glass and/or damaging the register drive mechanism.

It has therefore become common practice, as shown for example in Marsh Patent 2,216,016, to provide a simple opening in the wall of the register drive compartment to allow free drainage of this leakage. However, it has been found that by insertion of a wire or tool through a simple opening of this type the register drive can be tampered with by unauthrozide persons and often the meter is so jammed as not to register passage of water through the meter. The present invention provides a drain arrangement that effectively prevents such tampering.

It is therefore the main object of this invention to provide a novel drain arrangement for the register drive compartment of a water meter or the like.

A further object of the invention is to provide a novel water meter register compartment drain embodying a tube opening through a side wall of the compartment and having a downwardly directed section and a downwardly open end within the compartment.

Further objects of the invention will appear as the description proceeds in connection with the appended claims and the annexed drawing which illustrates partially in section a side elevation of a water meter assembly containing the drain according to a preferred embodiment of the invention.

A water meter which may be of the type disclosed in Marsh 2,216,016 or the oscillating piston type comprises a housing 11 that is connected into the water pipe line and contains an element (not shown) driven by water flow through the housing to rotate a register drive shaft 12.

The upper wall of housing 11 is integrally formed with an external rim 13 surrounding a shallow depression 14 having a slightly convex upward bottom surface 15. A cup-shaped casing 16 has its open end fixed fluid tight with rim 13 and extends upwardly to define with and above depression 14 a register drive mechanism compartment 17 wherein the register gears, etc. indicated at M are connected to shaft 12. Register R is mounted above casing 16 and driven by the mechanism M.

Centrally of depression 14 rises an integral post 18 that is externally threaded at 19 and formed with a smooth inner bore 21 that has an enlarged counterbore 22 at its upper end. Bores 21 and 22 are lined by an integral tubular hard rubber bushing 23 through which the shaft 12 extends with sufficient rotating clearance that the bushing exerts no drag on the smooth cylindrical steel shaft. Water from housing 11 may enter between the shaft and bushing to serve as a lubricant. Bushing 23 is preferably suitably fixed in the bores.

An annular nut 24 is mounted on threads 19 and shaft 12 projects through a suitable opening in the center of the nut. Compressible packing material 25 is enclosed between the nut and the top of post 18 around the shaft, and when nut 24 is drawn tight the shaft is at least initially sealed against leakage through the post.

The foregoing structure is more or less conventional and any shaft packing arrangement may be used without departing from the spirit of the invention.

It will be noted that water rising along shaft 12 during leakage out of housing 11 will tend to accumulate in the register drive compartment above surface 15.

The invention provides a novel drain for preventing the level of accumulated water from rising to the mechanism above the top of post 18, and to this end an opening 26 is provided in the side of casing 16 well above surface 15. The axis of opening 26 is inclined at a suitable angle, preferably about 60°, to the axis of shaft 12. Within opening 26 is staked or otherwise fixed one end of a tubular drain conduit 27 which as illustrated has an outer end portion 28 that extends upwardly from opening 26 at about 60° to the axis of shaft 12, an intermediate arcuate portion 29 where the tube levels off and then turns downward and an inner end potrion 31 that extends downwardly at an angle toward the bottom of the compartment to terminate with its open end adjacent but clear of surface 15.

In practice it has been found preferable to locate the upper part of tube portion 31 about horizontally even with the top of post 18. With this arrangement it will be seen that water leaking from the housing and/or condensate may accumulate in the compartment, first filling depression 14 and rising toward the top of post 18. The rising water fills the end of tube 27 and when the level within the compartment becomes higher than the lower part of tube section 29 the resultant head causes drainage to start through tube 27 and the water level within the compartment is thereby limited. Tube 27 is large enough to take care of any normally expected rate of leakage through the packing even after considerable wear.

The arrangement of tube 27 prevents insertion of a wire or the like through the tube to gain access to the mechanism M above post 18, since a flexible wire emerging through the downwardly directed open end 31 of the tube cannot be formed into such a reverse bend within the compartment as would be necessary to reach that mechanism.

The invention therefore provides a novel drain arrangement for a water meter wherein unauthorized tampering with the register mechanism by access through a drain opening is effectively prevented.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a water meter wherein a register drive compartment is provided above a housing through which the water flows to actuate a rotatable register drive shaft that extends through a packed bearing into said compartment, register drive mechanism within said compartment operatively connected to said shaft and located above said bearing, the provision of a drain for said compartment for preventing rise of liquid within said compartment to the level of said drive mechanism comprising an aperture in the compartment side wall at a level below said mechanism and above the bottom extremity of said compartment and a hollow conduit extending into said compartment from said aperture and extending downwardly to terminate with its open end facing and adjacent the bottom extremity of said compartment.

2. In a water meter assembly wherein water flows through a housing to actuate an element that rotates a register drive shaft, a register drive mechanism compartment enclosing casing is provided on the top of said housing into which said shaft projects through a shaft seal and a register is mounted above said mechanism to be driven thereby; the provision of means for draining excess water from said casing comprising an aperture in the side of said casing above the bottom of said compartment, and a drain conduit projecting into said compartment from said aperture with its inner end turned down and having an inner opening directed toward and adjacent to the bottom of said compartment, said conduit having an outer section extending from said aperture upwardly at an angle to said shaft, an intermediate section where said conduit levels and starts to turn downwardly and an inner section extending down toward said compartment bottom.

3. In a water meter assembly, a rigid meter housing having an imperforate top wall formed with a bore, an upstanding post on said wall providing a continuation of said bore, a rotatable shaft extending through said bore, a compressible shaft packing at said bore, a register drive mechanism compartment side wall upstanding from said housing surrounding said post and adapted to mount register drive mechanism above said post, and means providing a drain for said compartment comprising an aperture in said side wall below said mechanism and a drain conduit extending from said aperture inwardly from said side wall and downwardly in the compartment space between said side wall and the post to terminate in an end portion having an opening adjacent and directed toward said housing top wall.

4. In a water meter wherein a register drive compartment is provided above a housing through which the water flows to actuate a rotatable register drive shaft extending through a packed bearing into said compartment, said meter having a register drive mechanism within said compartment operatively connected to said shaft and located above said bearing, a drain for said compartment comprising means defining an aperture in the compartment side wall at a level below said mechanism, and a hollow conduit extending into said compartment from said aperture, said conduit being disposed below said drive mechanism along its entire length and said conduit having angularly related portions and the inner end of said conduit facing a wall of said compartment below said mechanism.

5. In a water meter wherein a register drive compartment is provided above a housing through which the water flows to actuate a rotatable register drive shaft extending through a packed bearing into said compartment, said meter having a register drive mechanism within said compartment operatively connected to said shaft and located above said bearing, a drain for said compartment comprising means defining an aperture in the compartment side wall at a level below said mechanism, and a hollow conduit extending into said compartment from said aperture and being disposed below the level of said mechanism throughout its length and said conduit having a wall portion facing said aperture to prevent tampering with said drive mechanism.

References Cited in the file of this patent

UNITED STATES PATENTS

| | | |
|---|---|---|
| 696,692 | Nash et al. | Apr. 1, 1902 |
| 1,146,674 | Van Gilder | July 13, 1915 |
| 1,249,886 | Barrus | Dec. 11, 1917 |
| 2,216,016 | Marsh | Sept. 24, 1940 |

FOREIGN PATENTS

| | | |
|---|---|---|
| 513,765 | Great Britain | Oct. 20, 1939 |